US006877895B2

(12) United States Patent
Mayusumi et al.

(10) Patent No.: US 6,877,895 B2
(45) Date of Patent: Apr. 12, 2005

(54) FIRE SENSOR

(75) Inventors: Kari Mayusumi, Tokyo (JP); Yukio Yamauchi, Kanagawa-ken (JP); Hiroshi Shima, Kanagawa-ken (JP)

(73) Assignee: Hochiki Corporation (JP)

( * ) Notice: Subject to any disclaimer, the term of this patent is extended or adjusted under 35 U.S.C. 154(b) by 0 days.

(21) Appl. No.: 10/245,392

(22) Filed: Sep. 18, 2002

(65) Prior Publication Data

US 2003/0058116 A1 Mar. 27, 2003

(30) Foreign Application Priority Data

Sep. 27, 2001 (JP) ....................................... 2001-295530

(51) Int. Cl.[7] .......................... G01K 13/02; G01K 7/00; G01K 1/00

(52) U.S. Cl. ........................ 374/138; 374/208; 374/163

(58) Field of Search ................................ 374/163, 138, 374/141, 29, 30, 135, 137, 208, 109; 340/577, 628, 693.6, 584

(56) References Cited

U.S. PATENT DOCUMENTS 4,292,844 A * 10/1981 Sawa et al. ................. 257/470
4,388,617 A * 6/1983 Nakanishi et al. .......... 340/594
5,351,034 A * 9/1994 Berger et al. ............... 340/577
5,450,066 A * 9/1995 Brighenti et al. ........... 340/589
6,057,775 A * 5/2000 Sakurai et al. .............. 340/629
6,166,648 A * 12/2000 Wiemeyer et al. .......... 340/630
6,250,801 B1 * 6/2001 Bernard ....................... 374/138
6,300,876 B1 * 10/2001 Sakurai et al. .............. 340/630
6,636,154 B2 * 10/2003 Brundage et al. ........ 340/693.6
6,737,977 B2 * 5/2004 Nishikawa et al. ......... 340/628
2002/0084907 A1 * 7/2002 Rattman et al. ............ 340/630
2003/0063005 A1 * 4/2003 Mayusumi et al. ......... 340/584

FOREIGN PATENT DOCUMENTS

GB 2215502 A * 9/1989 ........... G08B/17/06
JP 52138898 A * 11/1977 ........... G08B/17/06
JP 01166288 A * 6/1989 ........... G08B/17/06
JP 01191294 A * 8/1989 ........... G08B/17/06
JP 01259494 A * 10/1989 ........... G08B/17/06
JP 01270199 A * 10/1989 ........... G08B/17/06
JP 02024800 A * 1/1990 ........... G08B/17/06
JP 05046879 A * 2/1993 ........... G08B/17/12
JP 05174268 A * 7/1993 ........... G08B/17/06
JP 05210791 A * 8/1993 ........... G08B/17/06
JP 06131573 A * 5/1994 ........... G08B/17/06
JP 9-259376 10/1997
JP 10154283 A * 6/1998 ........... G08B/17/00
JP 10-188163 7/1998
JP 2002367048 A * 12/2002 ........... G08B/17/04

* cited by examiner

*Primary Examiner*—Diego Gutierrez
*Assistant Examiner*—Mirellys Jagan
(74) *Attorney, Agent, or Firm*—Blank Rome LLP

(57) ABSTRACT

A fire sensor comprising a heat detection element for detecting heat from a hot airflow generated by a fire, a sensor main body, and an outer cover, which has a plurality of plate fins protruding from the sensor main body, for protecting the heat detecting element. The plate fins have a predetermined offset angle to a center line passing through the center of the outer cover and are erected approximately perpendicular to the sensor main body.

9 Claims, 15 Drawing Sheets

PRIOR ART (B)

PRIOR ART

PRIOR ART

FIRE SENSOR

BACKGROUND OF THE INVENTION

1. Field of the Invention

The present invention relates generally to a fire sensor, and more particularly to a fire sensor with an outer cover for protecting a heat sensing element which detects heat from a hot airflow generated by a fire.

2. Description of the Related Art

As a device for detecting the high temperature or speed of a rise in temperature caused by a fire and issuing an alarm, there is a fire sensor employing a heat detecting element such as a thermistor (Japanese Laid-Open Patent Publication Nos. HEI 9-259376 and HEI 10-188163).

FIG. 14 shows a prior art fire sensor 101. The fire sensor 101 includes a sensor main body 102, a heat detecting element 103 mounted on the sensor main body 102 for detecting heat from a hot airflow generated by a fire, and an outer cover 104 for protecting the heat detecting element 103.

The outer cover 104, as shown in FIG. 15, has a plurality of plate fins 105 for purposes of preventing the hand from touching the heat detecting element 103 and also collecting a hot airflow within the cover 104. The plate fins 105 are disposed toward the cover center.

However, in prior art fire sensors with the outer cover 104 for protecting the heat detecting element 103, a hot airflow cannot be efficiently introduced and collected around the heat sensing element 103 by the plate fins 105 disposed toward the cover center. Because of this, when the outer cover 104 is exposed to a hot airflow, the time lag of a rise in the temperature of the heat detecting element 103 becomes great and there is a problem of reducing a sensitivity to detection.

SUMMARY OF THE INVENTION

The present invention has been made in view of the circumstances mentioned above. Accordingly, it is the primary object of the present invention is to provide a fire sensor which includes an outer cover configured to enhance sensitivity to detecting a hot airflow generated by a fire.

To achieve this end and in accordance with the present invention, there is provided a fire sensor comprising (1) heat detection means for detecting heat from a hot airflow generated by a fire, (2) a sensor main body provided with the heat detection means, and (3) an outer cover, which has a plurality of plate fins protruding from the sensor main body, for protecting the heat detection means. The plate fins have a predetermined offset angle to a center line passing through the center of the outer cover and are erected approximately perpendicular to the sensor main body.

According to the present invention, if the outer cover is exposed to a hot airflow generated by a fire, the hot airflow is caused to flow like a vortex toward the center of the outer cover by the plate fines and is collected around the heat sensing means. Therefore, sensitivity to detecting a hot airflow can be enhanced.

It is preferable that the predetermined angle be about 20 to 30 degrees to the center line passing through the center of the outer cover.

In the fire sensor of the present invention, the outer cover may further have an airflow introducing plate which is mounted on the upper ends of the plate fins. The airflow introducing plate is disposed approximately parallel to the sensor main body. With the airflow introducing plate, a hot airflow introduced into the outer cover by the plate fines is efficiently collected around the above-described heat sensing means. Therefore, sensitivity to detecting a hot airflow can be further enhanced.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Preferred embodiments of the present invention will hereinafter be described in detail with reference to the drawings.

Figure 1:
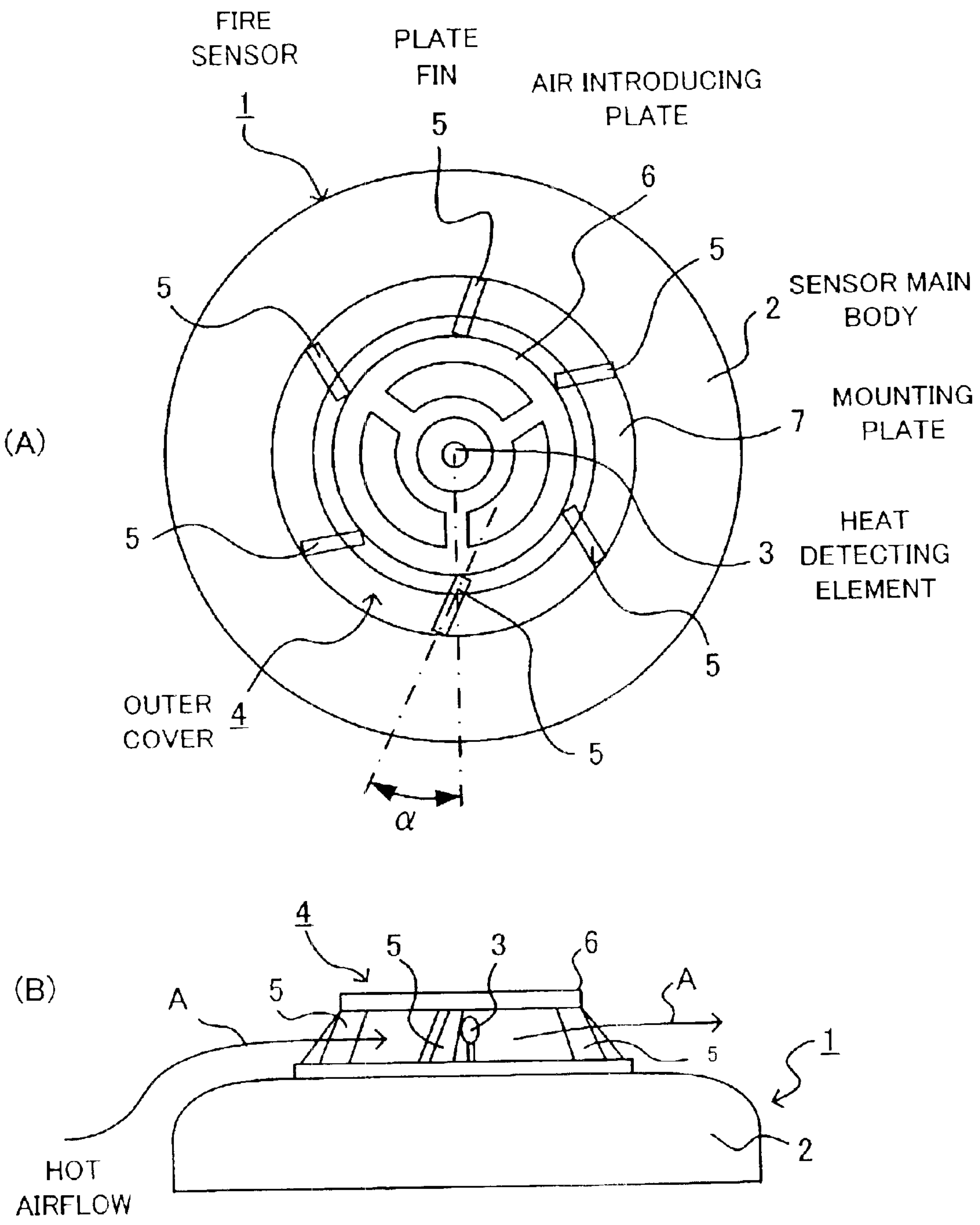
FIG. 1A is a plan view of a fire sensor constructed in accordance with a first embodiment of the present invention.
FIG. 1B is a side view of the fire sensor shown in FIG. 1A.

Referring now to FIG. 1, there is depicted a fire sensor 1 constructed in accordance with a first embodiment of the present invention. The fire sensor 1 of the first embodiment includes a heat detecting element 3, which protrudes toward the center of the lower portion of a sensor main body 2 mounted, for example, on a ceiling. The heat detecting element 3 consists of a thermistor. In addition to a thermistor, the heat detecting element 3 may consist of a temperature detecting element such as a transistor, a diode, a thermocouple, etc.

The heat detecting element 3 is provided with an outer cover 4 for protection. The outer cover 4 has a plurality of plate fins 5 which are disposed on a mounting plate 7 on the side of the sensor main body 2 so as to surround the heat detecting element 3. In the first embodiment, 6 (six) plate fins 5 are disposed to protrude from the sensor main body 2.

As illustrated in FIG. 1, each plate fin 5 is disposed obliquely at a predetermined offset angle α to a center line passing through the center of the outer cover 4, and is erected approximately perpendicular to the sensor main body 2. The angle α of the plate fine 5 is in a range of about 20 to 30 degrees to the center line passing through the center of the outer cover 4.

The outer cover 4 further has an airflow introducing plate 6 at the upper ends of the plate fins 5. The airflow introducing plate 6 is disposed approximately parallel to the sensor main body 2. In the first embodiment, the airflow introducing plate 6 consists of two rings interconnected at three points.

Figure 2:
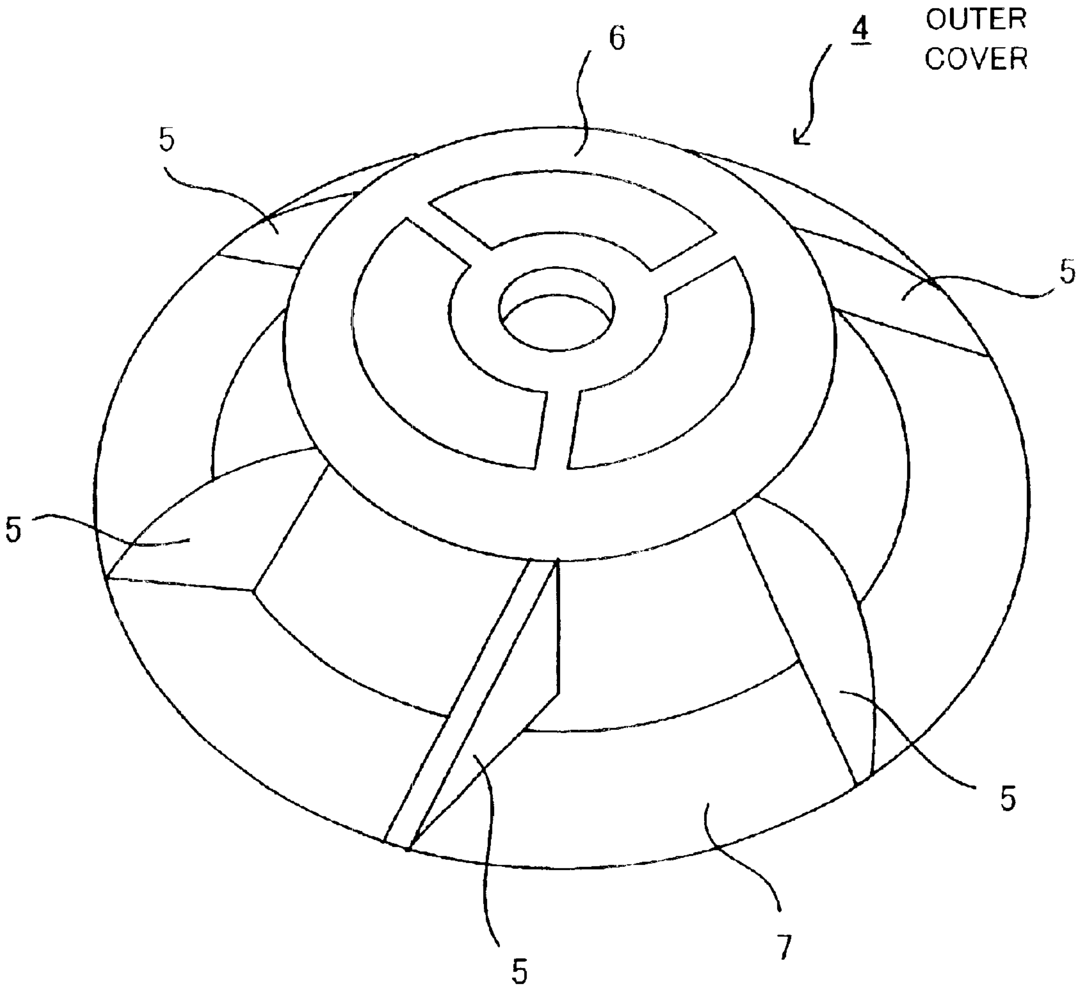
FIG. 2 is a perspective view of the outer cover shown in FIGS. 1A and 1B.

FIG. 2 shows a perspective view of the outer cover 4 shown in FIG. 1. Between the mounting plate 7 on the side of the sensor main body 2 and the airflow introducing plate 6, a plurality of plate fins 5 are disposed at a predetermined offset angle α to the cover center so that a hot airflow generated by a fire can be efficiently introduced to the heat detecting element 3 disposed within the cover 4.

Figure 3:
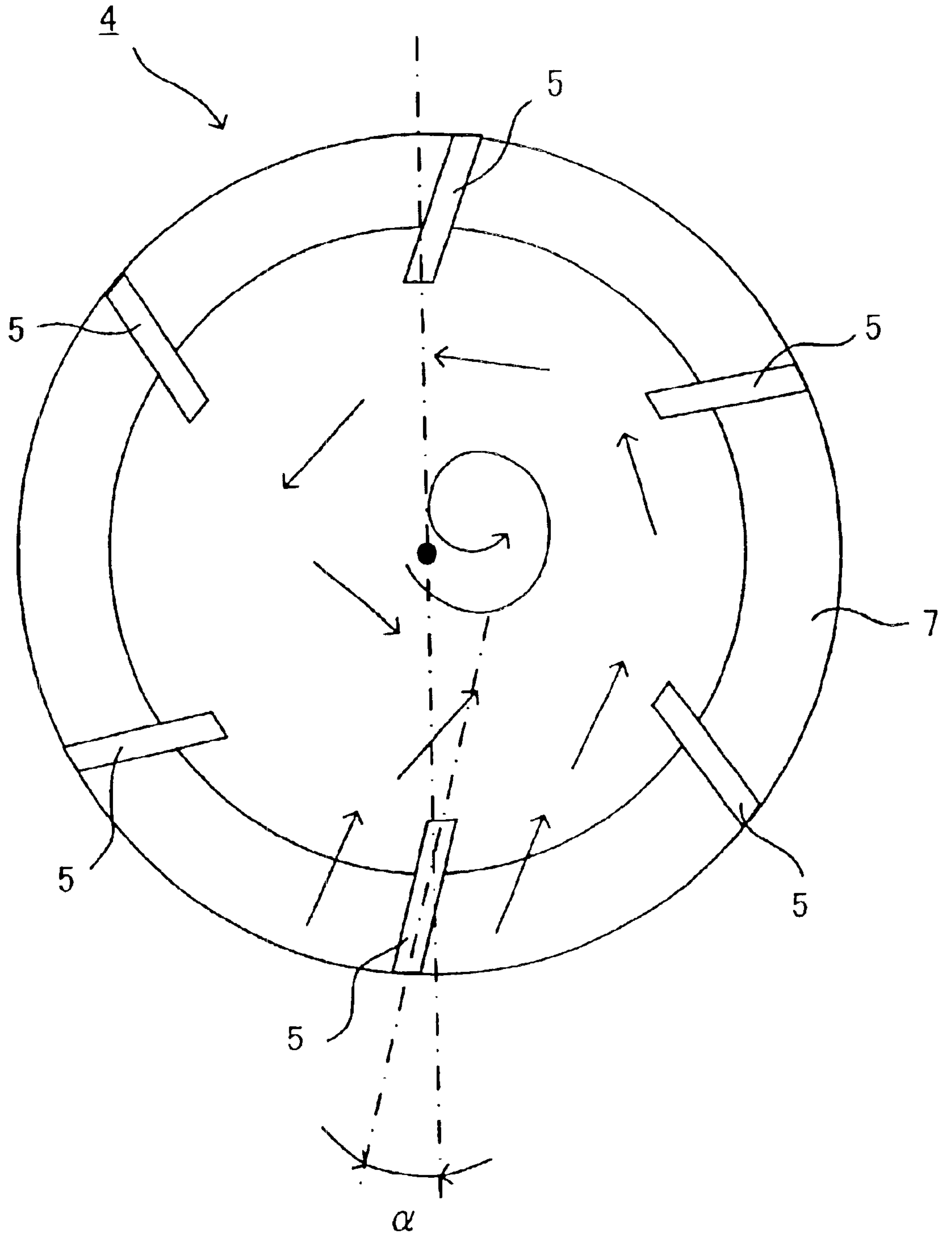
FIG. 3 is a plan view used to explain how a hot airflow generated by a fire is introduced into the outer cover.

FIG. 3 illustrates how a hot airflow is introduced into the outer cover 4 of the first embodiment, the airflow introducing plate 6 having been removed to show the movement of the hot airflow within the cover 4. In the figure, assuming that a hot airflow generated by a fire occurs as indicated by arrows, this hot airflow enters into the outer cover 4 along the plate fins 5 which are situated in the direction of the hot airflow. Since the plate fins 5 have an offset angle α of about 20 to 30 degrees to the center of the cover 4, the hot airflow is introduced in a direction offset slightly from the cover center by the plate fins 5. The hot airflow introduced within the outer cover 4 strikes the inner edge of each plate fin 5 and flows like a vortex toward the cover center. Since the hot airflow introduced within the outer cover 4 is collected around the cover center, the sensitivity of the heat detecting element 3 installed at the central portion of the cover 4 can be enhanced.

Figure 4:
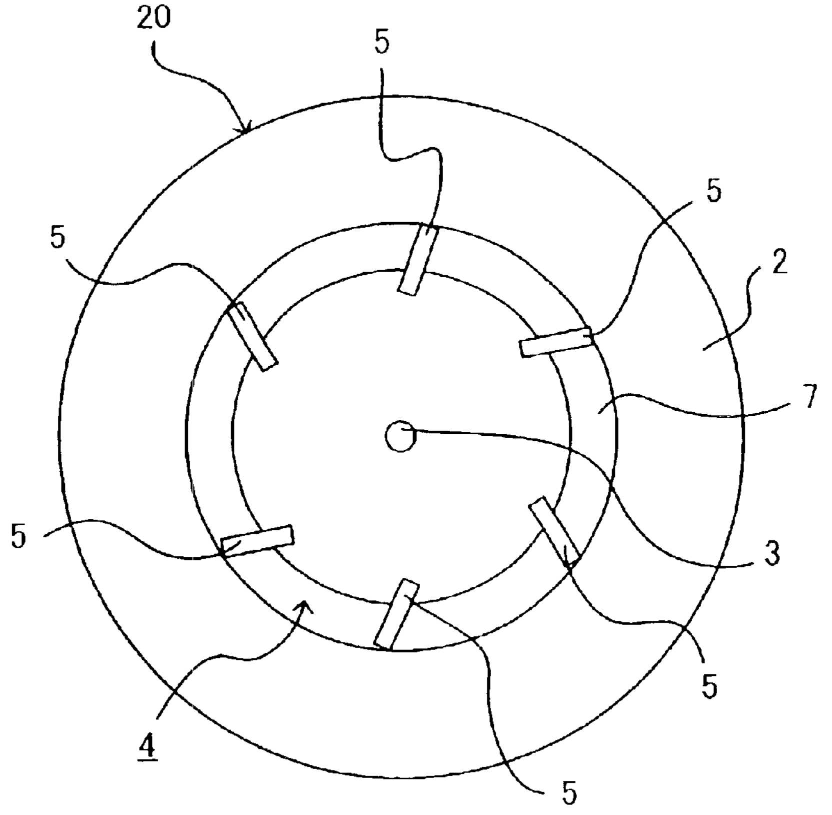
FIG. 4A is a plan view of a fire sensor constructed in accordance with a second embodiment of the present invention.
FIG. 4B is a side view of the fire sensor shown in FIG. 4A.
Figure 4:
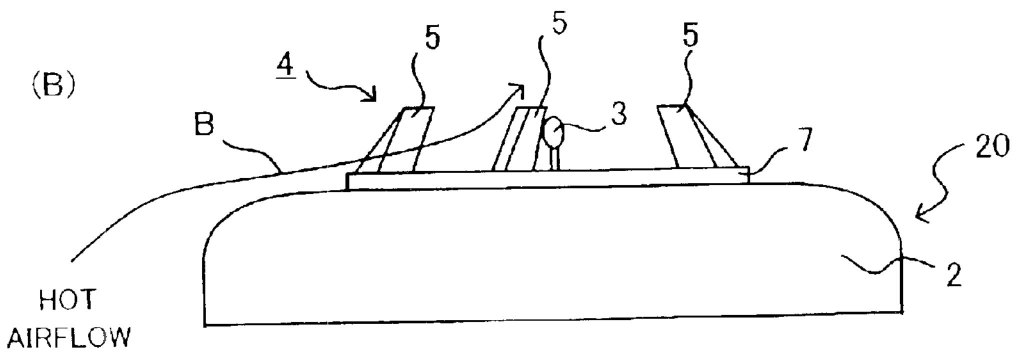

Referring to FIG. 4, there is depicted a fire sensor 20 constructed in accordance with a second embodiment of the present invention. The second embodiment is similar to the first embodiment of FIG. 1, but different in that it does not include the airflow introducing plate 6 of the outer cover 4 of the first embodiment. Note that the same reference numerals denote the same parts as those of the first embodiment and therefore a detailed description is omitted for avoiding redundancy.

The fire sensor 20 of the second embodiment includes a heat detecting element 3 that protrudes toward the center of the lower portion of a sensor main body 2 mounted, for example, on a ceiling. The fire sensor 20 further includes an outer cover 4 for protecting the detecting element 3. The outer cover 4 has a plurality of plate fins 5 which are disposed on a mounting plate 7 on the side of the sensor main body 2 so as to surround the heat detecting element 3. In the second embodiment, 6 (six) plate fins 5 are disposed. As with the first embodiment, each plate fin 5 has a predetermined offset angle α to a center line passing through the center of the outer cover 4, and is erected approximately perpendicular to the sensor main body 2.

Figure 5:
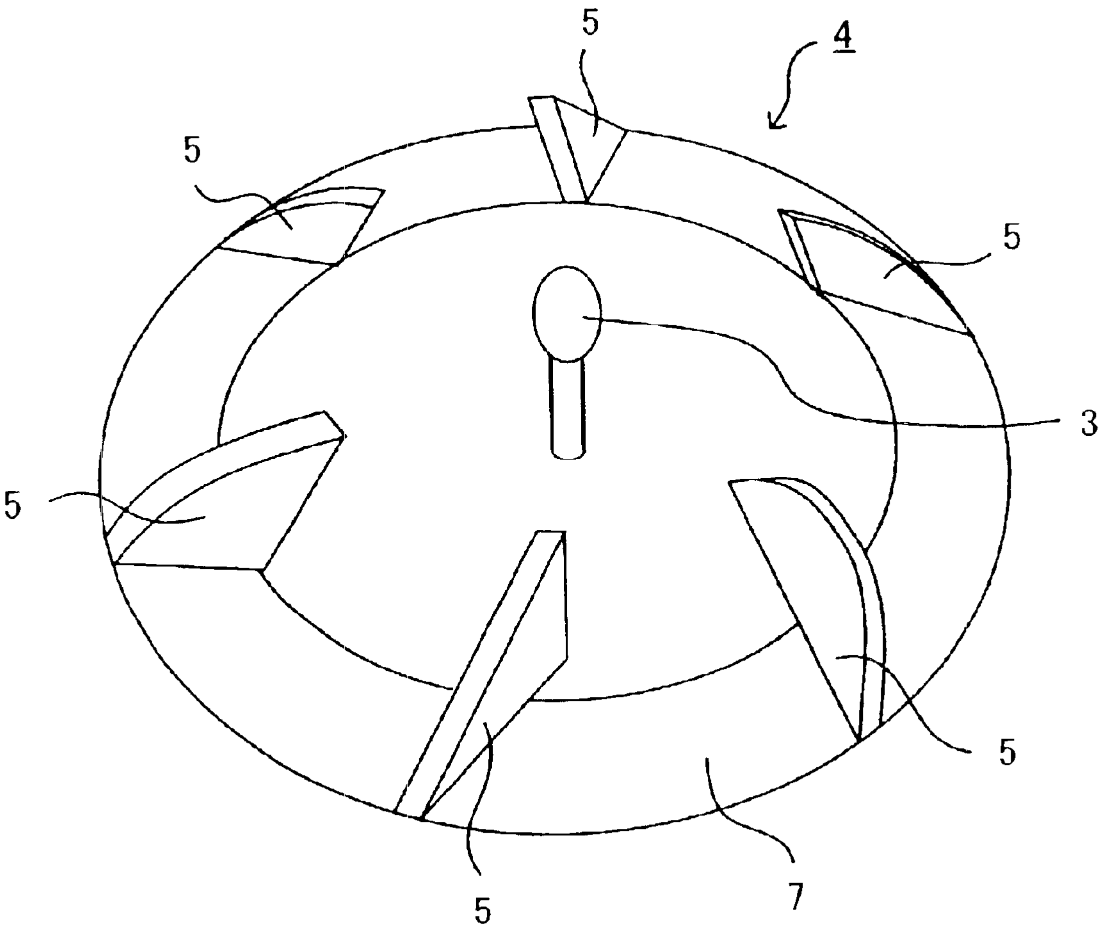
FIG. 5 is a perspective view of the outer cover shown in FIGS. 4A and 4B.

FIG. 5 shows a perspective view of the outer cover 4 of the second embodiment. As with the first embodiment, if a hot airflow is generated by a fire, the hot airflow is introduced at an offset angle α to the center of the heat detecting element 3 by the plate fins 5. Therefore, as in the first embodiment shown in FIG. 3, the introduced hot airflow is collected around the heat detecting element 3, and the sensitivity of the heat detecting element 3 can be enhanced.

The fire sensor 1 of the first embodiment with the airflow introducing plate 6 is excellent at collecting a hot airflow around the center of the outer cover 4, compared with the fire sensor 20 of the second embodiment having no airflow introducing plate. That is, as shown by an arrow A in FIG. 1B, a hot airflow flows along a mounting surface such as a ceiling surface and enters into the outer cover 4 through the openings between the plate fins 5. If the outer cover 4 has the airflow introducing plate 6, then the hot airflow passes through the interior of the outer cover 4 without escaping the central portion of the cover 4. Thus, the fire sensor 1 of the first embodiment has the effect of confining a hot airflow within the outer cover 4 by the airflow introducing plate 6.

On the other hand, in the outer cover 4 of the second embodiment having no airflow introducing plate, as shown by an arrow B in FIG. 4B, a hot airflow introduced within the outer cover 4 escapes the central portion of the cover 4. Therefore, since the effect of confining a hot airflow within the outer cover 4 is small compared with the first embodiment, the amount that the hot airflow is collected around the central portion of the cover 4 is reduced.

Figure 6:
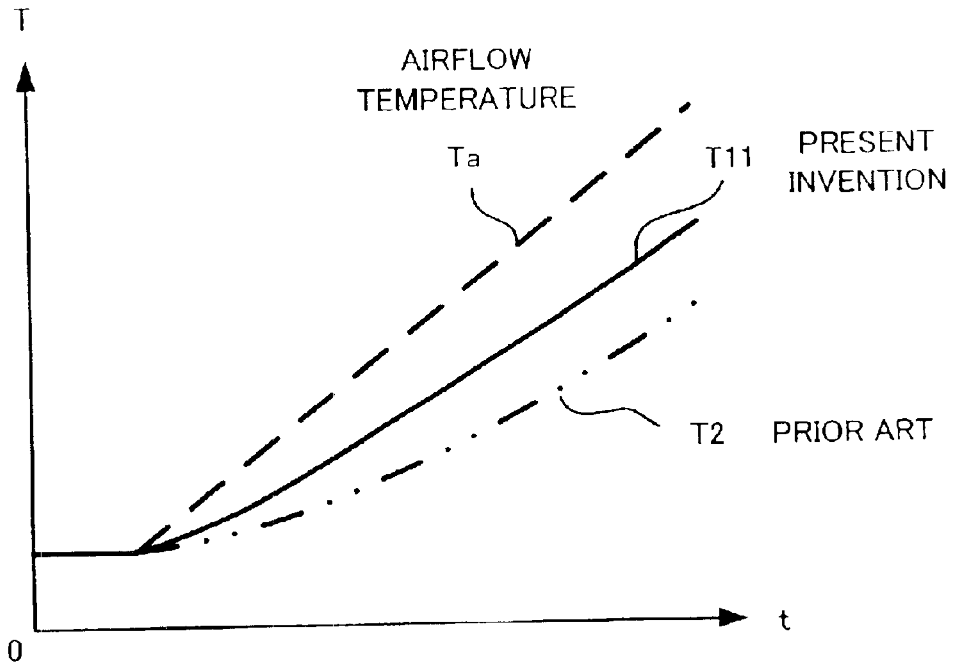
FIG. 6A is a characteristic diagram showing how the temperature of the heat detecting element in the first embodiment of FIG. 1 rises.
FIG. 6B is a characteristic diagram showing how the temperature of the heat detecting element in the second embodiment of FIG. 4 rises.
Figure 6:
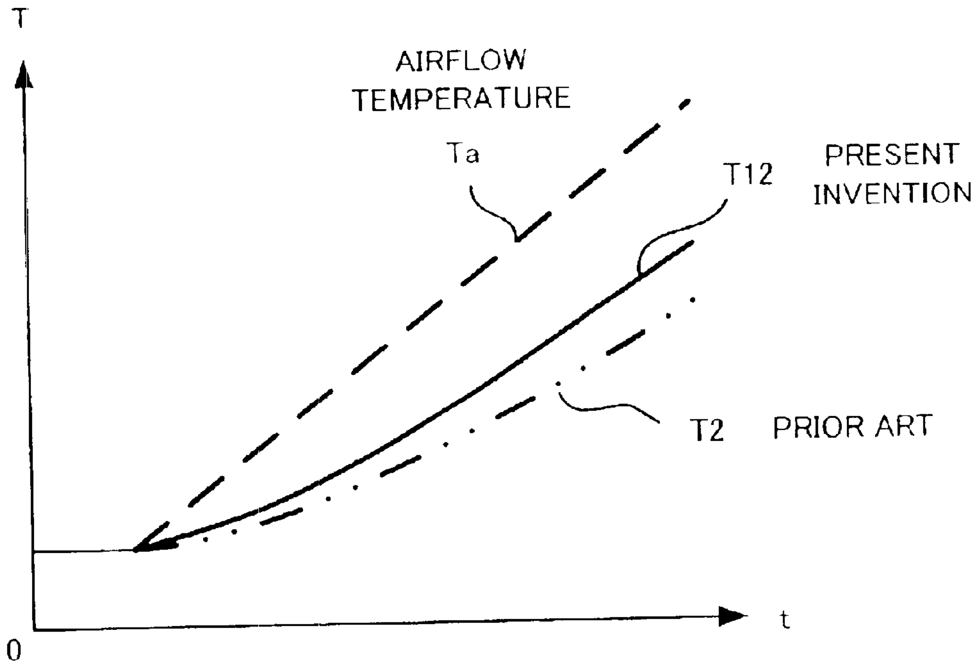

FIG. 6 shows the temperature characteristics of the heat detecting element 3 of the first embodiment having the airflow introducing plate 6 and the heat detecting element 3 of the second embodiment having no airflow introducing plate. By increasing the temperature of a hot airflow at a fixed rate, the temperature characteristics are compared with that of the conventional fire sensor shown in FIGS. 14 and 15.

FIG. 6A shows the case of the outer cover 4 of the first embodiment provided with the airflow introducing plate 6. If airflow temperature $T_a$ is linearly increased, the temperature T11 detected by the heat detecting element 3 of the first embodiment increases while following the airflow temperature $T_a$, as indicated by a solid line. In the conventional structure with the airflow introducing plate shown in FIGS. 14 and 15, the temperature T2 detected by the conventional structure increases as indicated by a one-dot chain line.

Therefore, the outer cover 4 of the first embodiment turns out to possess a high ability to follow the airflow temperature $T_a$ and a high sensitivity to detection, compared with the conventional structure.

Figure 14:
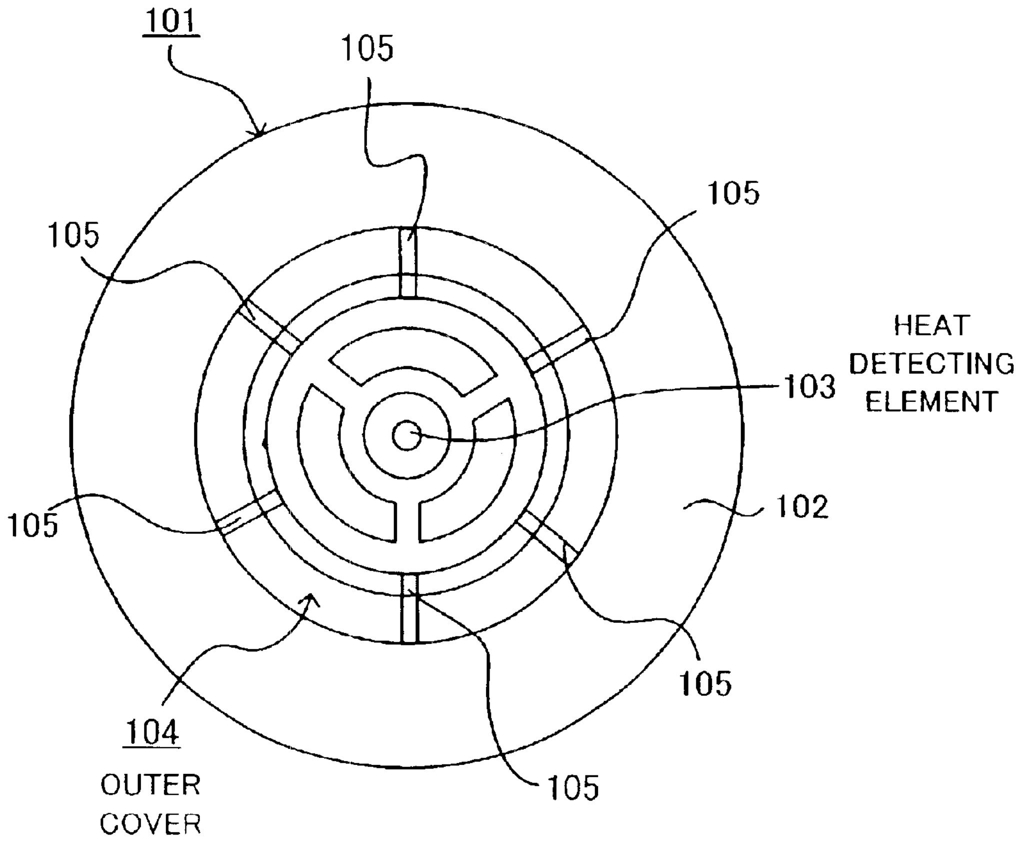
FIG. 14A is a plan view of a conventional fire sensor.
FIG. 14B is a side view of the conventional fire sensor shown in FIG. 14A.
Figure 14:
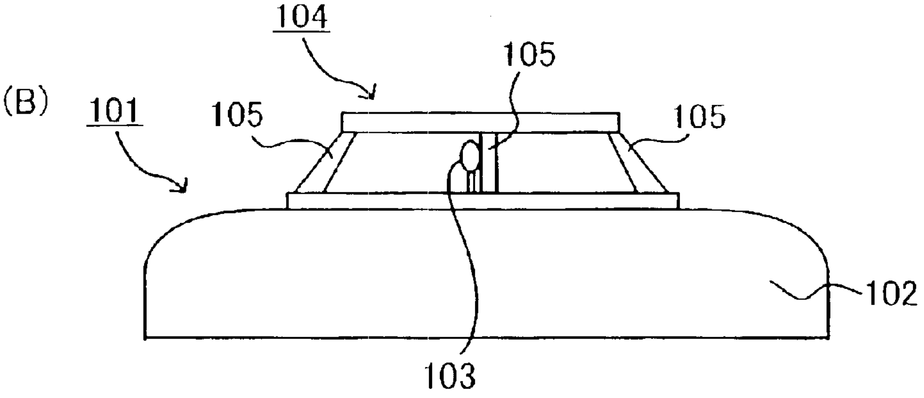
Figure 15:
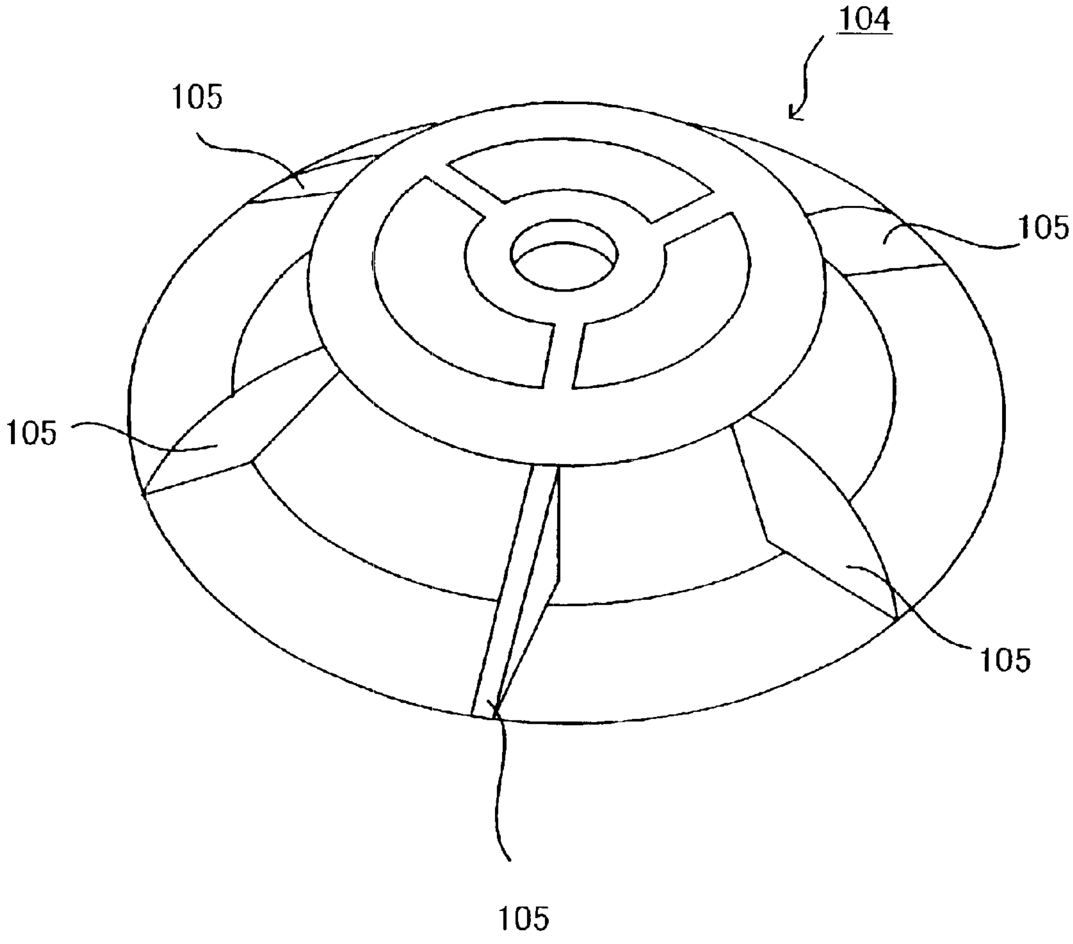
FIG. 15 is a perspective view of the outer cover shown in FIGS. 14A and 14B.

FIG. 6B shows the temperature characteristic of the outer cover 4 of the second embodiment that has no airflow introducing plate. If the airflow temperature $T_a$ is linearly increased at a fixed rate, the temperature T12 detected by the second embodiment of FIG. 4 increases while following the airflow temperature $T_a$. The temperature characteristic of the conventional structure shown in FIGS. 14 and 15 is the same as that shown in FIG. 6A.

In comparison of FIG. 6A and FIG. 6B, the temperature difference between the detected temperature T2 in the conventional structure and the detected temperature T11 in the first embodiment is greater at the high temperature side than the temperature difference between the detected temperature T2 in the conventional structure and the detected temperature T12 in the second embodiment. Therefore, it turns out that the first embodiment with the airflow introducing plate 6 possesses a higher ability to follow the airflow temperature $T_a$ and a higher sensitivity to detection.

Figure 7:
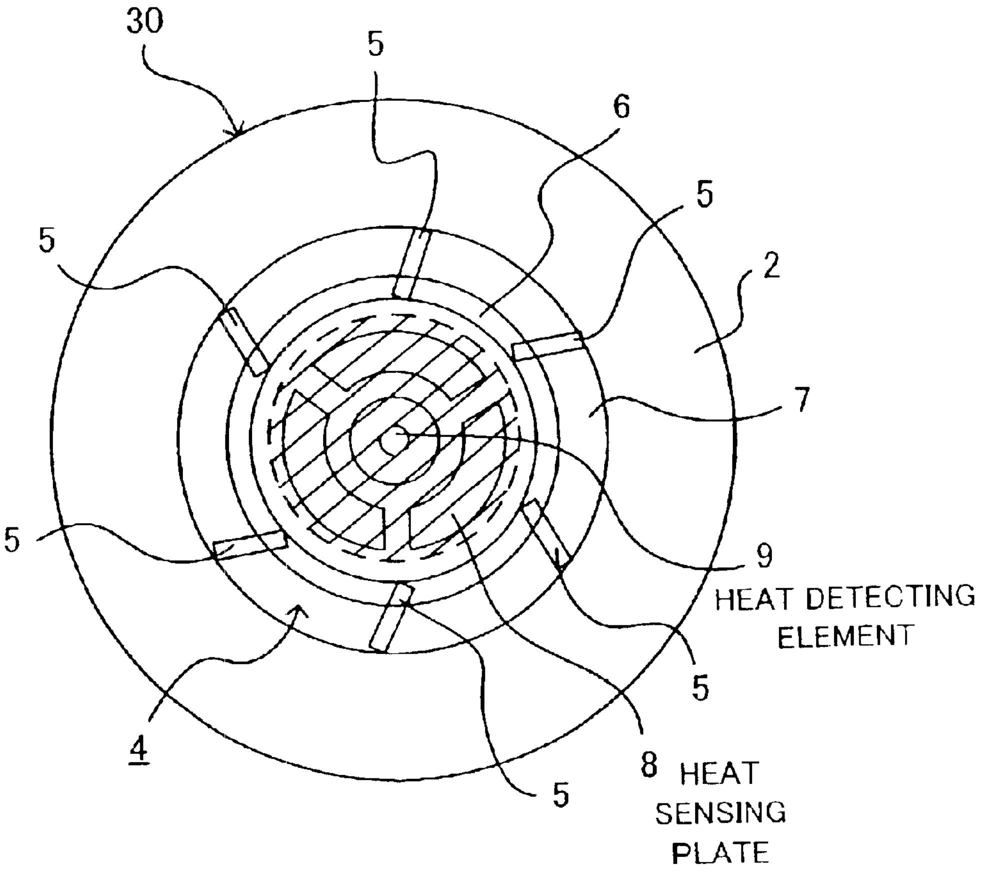
FIG. 7A is a plan view of a fire sensor constructed in accordance with a third embodiment of the present invention.
FIG. 7B is a side view of the fire sensor shown in FIG. 7A.
Figure 7:
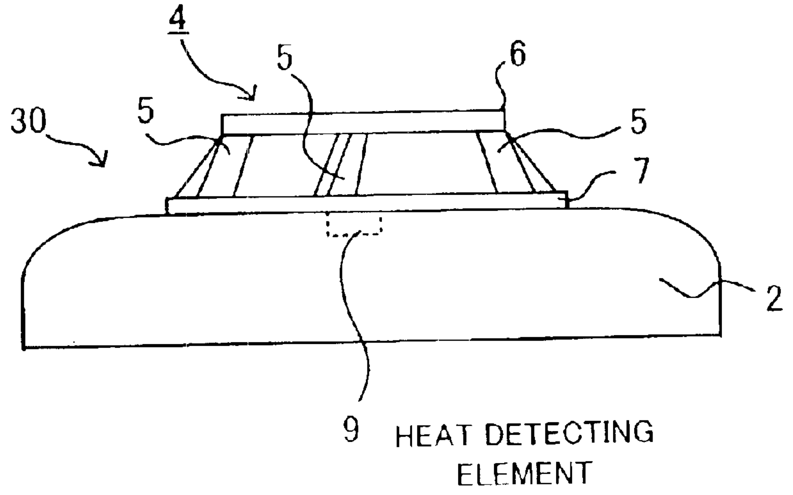

Referring to FIG. 7, there is depicted a fire sensor 30 constructed in accordance with a third embodiment of the present invention. The third embodiment is similar to the first embodiment of FIG. 1, but different in that the sensor main body has a heat sensing plate. Note that the same reference numerals denote the same parts as those of the first embodiment and therefore a detailed description is omitted for avoiding redundancy.

In FIG. 7, the main body 2 of the fire sensor 30 of the third embodiment has a heat sensing plate 8 at the central portion thereof, as shown by oblique lines. The heat sensing plate 8 consists, for example, of a metal plate with high heat conductivity and serves as a heat collecting plate with respect to a hot airflow. The inside of the heat sensing plate 8 is fixed to a heat detecting element 9 such as a thermistor. When the heat sensing plate 8 is exposed to a hot airflow, the temperature of the heat sensing plate 8 is detected by the heat detecting element 9.

The fire sensor 30 of the third embodiment, as in the first embodiment of FIG. 1, includes an outer cover 4. The outer cover 4 has a plurality of plate fins 5 (e.g., 6 (six) plate fins), which are disposed to surround the heat detecting element 9. The plate fins 5 are erected in a mounting plate 7 so that they have a predetermined offset angle α (of 20 to 30 degrees) to the cover center. The outer cover 4 further has an airflow introducing plate 6 that is mounted on the upper ends of the plate fins 5. The airflow introducing plate 6 is disposed approximately parallel to the sensor main body 2.

If the fire sensor 30 of the third embodiment employing the heat sensing plate 8 of FIG. 7 is exposed to a hot airflow generated by a fire, the hot airflow is introduced into the outer cover 4 by the plate fins 5 disposed at a predetermined offset angle α to the cover center, as shown in FIG. 3. Because of this, a vortical hot airflow is generated within the outer cover 4 and flows toward the cover center. In the third embodiment of FIG. 7, the heat sensing plate 8 is large enough to sense the vortical hot airflow within the outer cover 4. Because of this, the heat sensing plate 8 is exposed sufficiently to the hot airflow and rises in temperature. Therefore, a high sensitivity to detection, which efficiently follows a rise in the temperature of the hot airflow, can be obtained by the heat detecting element 9 held in direct contact with the heat sensing plate 8.

Figure 8:
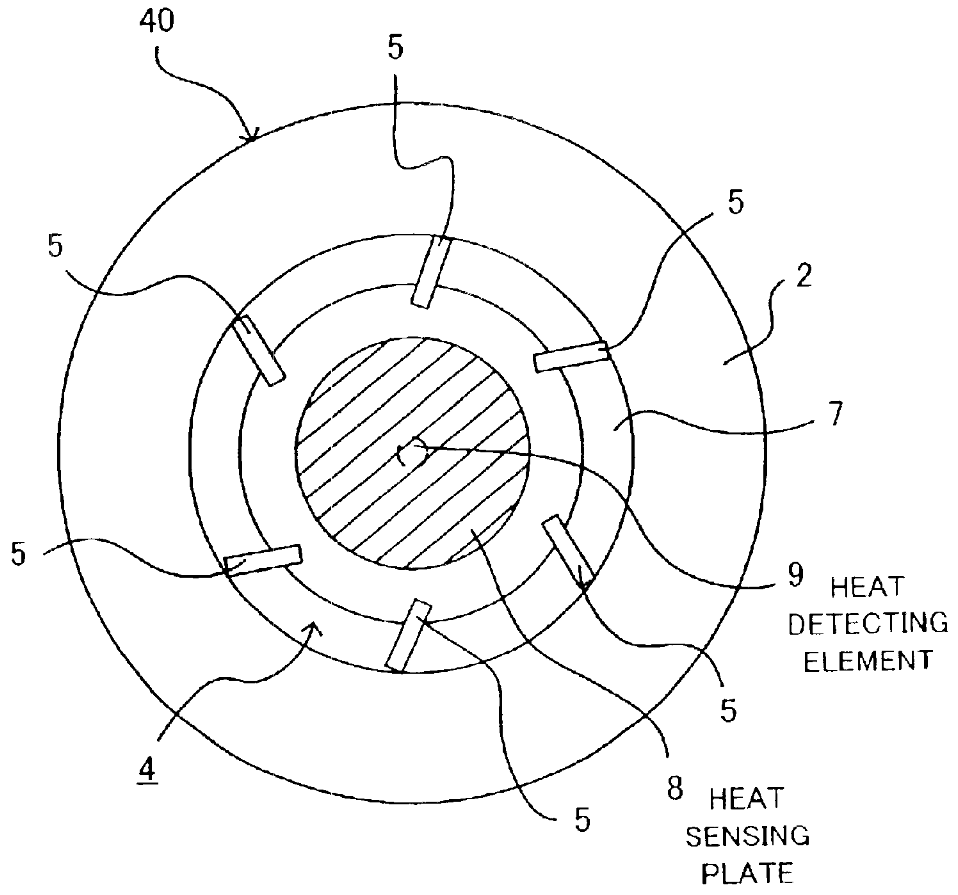
FIG. 8A is a plan view of a fire sensor constructed in accordance with a fourth embodiment of the present invention.
FIG. 8B is a side view of the fire sensor shown in FIG. 8A.
Figure 8:
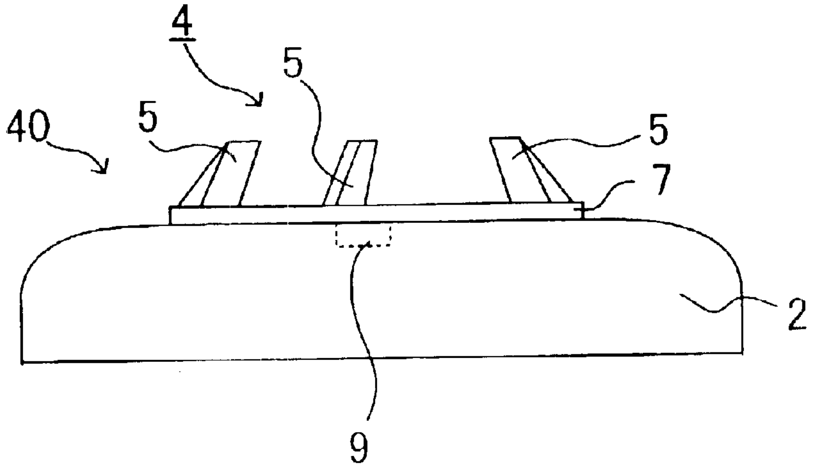

Referring to FIG. 8, there is depicted a fire sensor 40 constructed in accordance with a fourth embodiment of the present invention. The fourth embodiment is similar to the third embodiment of FIG. 7, but different in that it does not include the air introducing plate 6 of the outer cover 4 of the third embodiment. Note that the same reference numerals denote the same parts as those of the third embodiment and therefore a detailed description is omitted for avoiding redundancy.

As in the first embodiment, the outer cover 4 of the third embodiment having no airflow introducing plate generates a vortical flow that collects at the cover center when exposed to a hot airflow generated by a fire, as shown in FIG. 3. The heat sensing plate 8 is able to receive heat energy from the vortical hot airflow in a wide range. Therefore, the temperature of the hot airflow can be efficiently detected by the heat detecting element 9.

In the above-described embodiments, each of the fire sensors is equipped with the single heat sensing element 3 or 9. And the temperature detected by the heat sensing element 3 or 9 is compared with a threshold temperature that is used to judge a fire. When the detected temperature exceeds the threshold temperature, a fire detection signal is output to issue an alarm.

In addition to the above-described type, there is a fire sensor provided with a pair of heat detecting elements to judge a fire from the difference between temperatures detected by the two elements. One of the two elements has high sensitivity to a hot airflow, while the other has low sensitivity.

Figure 9:
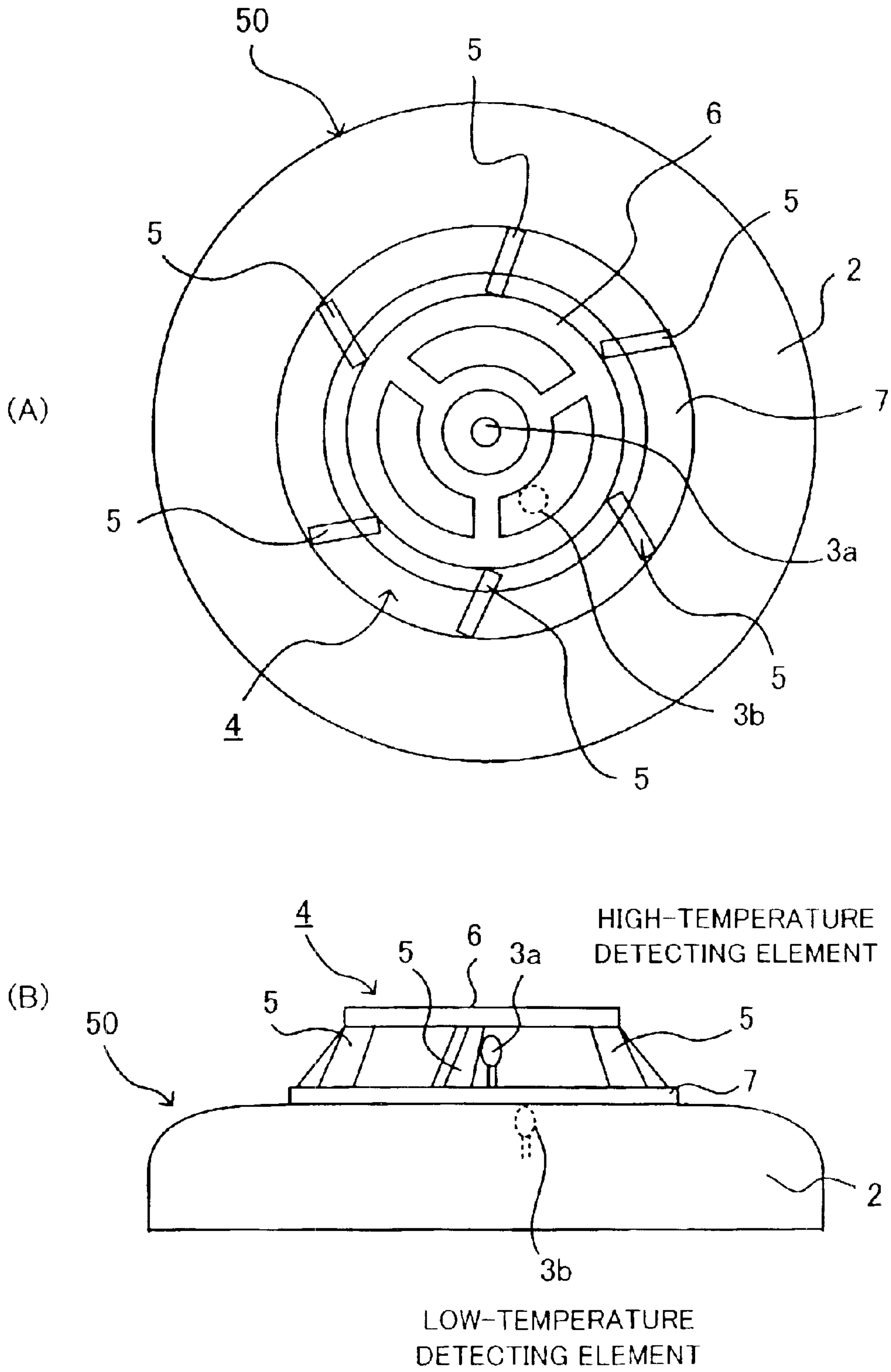
FIG. 9A is a plan view of a fire sensor constructed in accordance with a fifth embodiment of the present invention.
FIG. 9B is a side view of the fire sensor shown in FIG. 9A.

Referring to FIG. 9, there is depicted a fire sensor 50 constructed in accordance with a fifth embodiment of the present invention. The fifth embodiment is similar to the first embodiment of FIG. 1, but different in that it performs the above-described differential heat sensing. Note that the same reference numerals denote the same parts as those of the first embodiment and therefore a detailed description is omitted for avoiding redundancy.

The fire sensor 50 of the fifth embodiment includes a high-temperature detecting element 3*a* and a low-temperature detecting element 3*b*. The high-temperature detecting element 3*a* protrudes from a sensor main body 2 and is disposed at a position that is exposed directly to a hot airflow. The low-temperature detecting element 3*b* is disposed at a position, which is not exposed directly to a hot airflow, such as a position within the sensor main body 2.

The fire sensor 50 of the fifth embodiment further includes an outer cover 4, which is provided so as to protect the high-temperature detecting element 3*a* protruding from the sensor main body 2. When the fire sensor 50 is exposed to a hot airflow such as that shown in FIG. 3, a vortical hot airflow which flows toward the cover center is generated by a plurality of plate fines 5 having the above-described offset angle α, and an airflow introducing plate 6. Therefore, the temperature of the hot airflow can be efficiently detected by the high-temperature detecting element 3*a*.

In the low-temperature detecting element 3*b* installed within the sensor main body 2, a great time lag occurs when the temperature of a hot airflow generated by a fire rises sharply.

Therefore, in the above-described differential heat sensing, a temperature difference ($\Delta T = Th - Tc$) between the temperature Th detected by the high-temperature detecting element 3*a* and the temperature Tc detected by the low-temperature detecting element 3*b* is detected. When this temperature difference ΔT exceeds a predetermined threshold value which is judged to be a fire, a fire detection signal is output to issue an alarm.

When a hot airflow generated by a fire rises sharply in temperature, the temperature difference ΔT is obtained as a great value. However, when temperature rises slowly, the temperature difference ΔT rises slowly and is saturated at a certain value. Therefore, there can be realized a differential heat sensor for discriminating a temperature difference caused by an ordinary change in temperature from the temperature difference ΔT caused by a fire.

Figure 10:
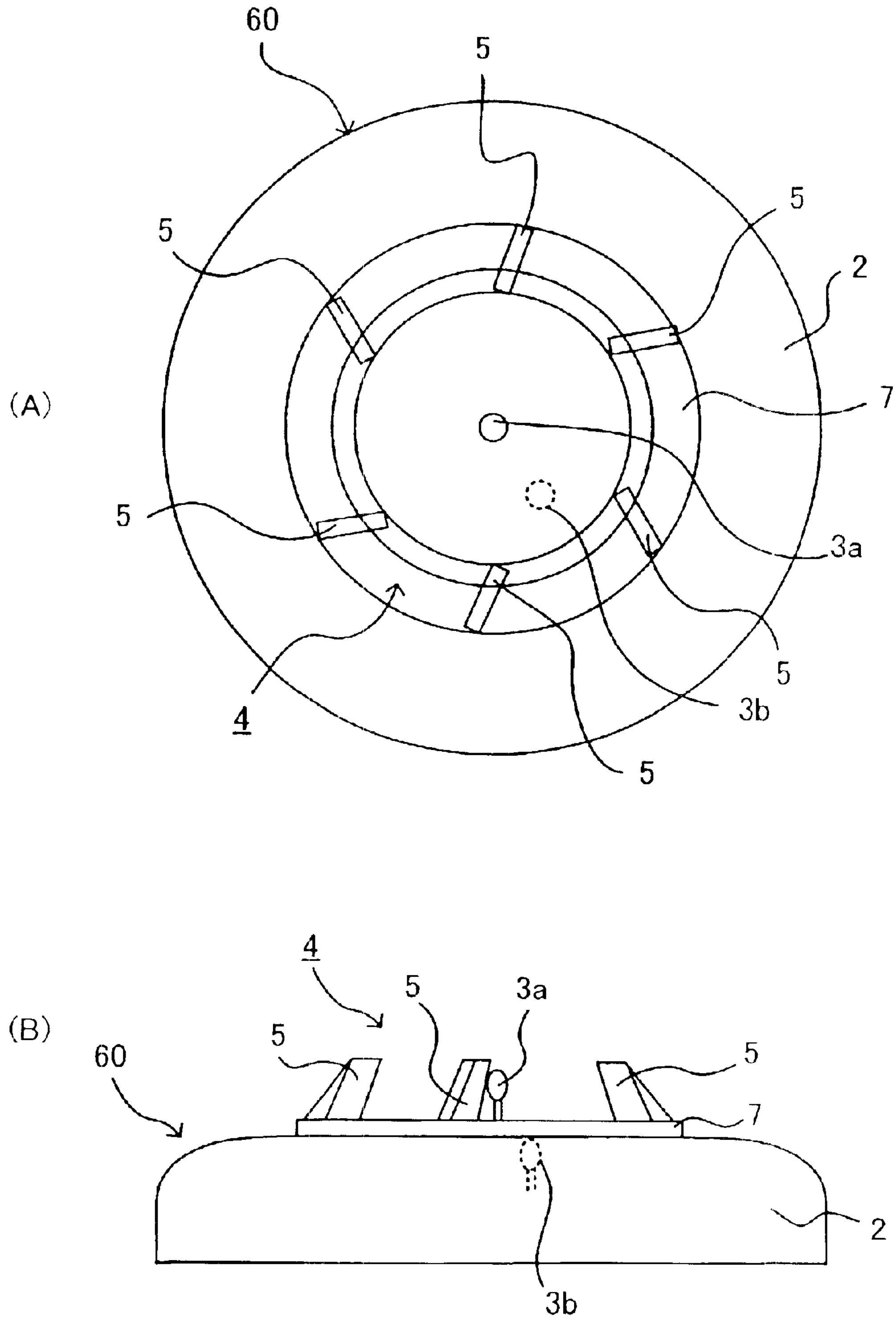
FIG. 10A is a plan view of a fire sensor constructed in accordance with a sixth embodiment of the present invention.
FIG. 10B is a side view of the fire sensor shown in FIG. 10A.

Referring to FIG. 10, there is depicted a fire sensor 60 constructed in accordance with a sixth embodiment of the present invention. The sixth embodiment is similar to the fifth embodiment of FIG. 9, but different in that it does not include the air introducing plate 6 of the outer cover 4 of the fifth embodiment. Note that the same reference numerals denote the same parts as those of the fifth embodiment and therefore a detailed description is omitted for avoiding redundancy.

As in the fifth embodiment of FIG. 9, a hot airflow generated by a fire is introduced so that it collects around a high-temperature detecting element 3*a*. Therefore, the temperature of the hot airflow is efficiently detected by the high-temperature detecting element 3*a*. In addition, based on the temperature difference ΔT between the temperature detected by the high-temperature detecting element 3*a* and the temperature detected by a low-temperature detecting element 3*b*, a fire can be judged.

Figure 11:
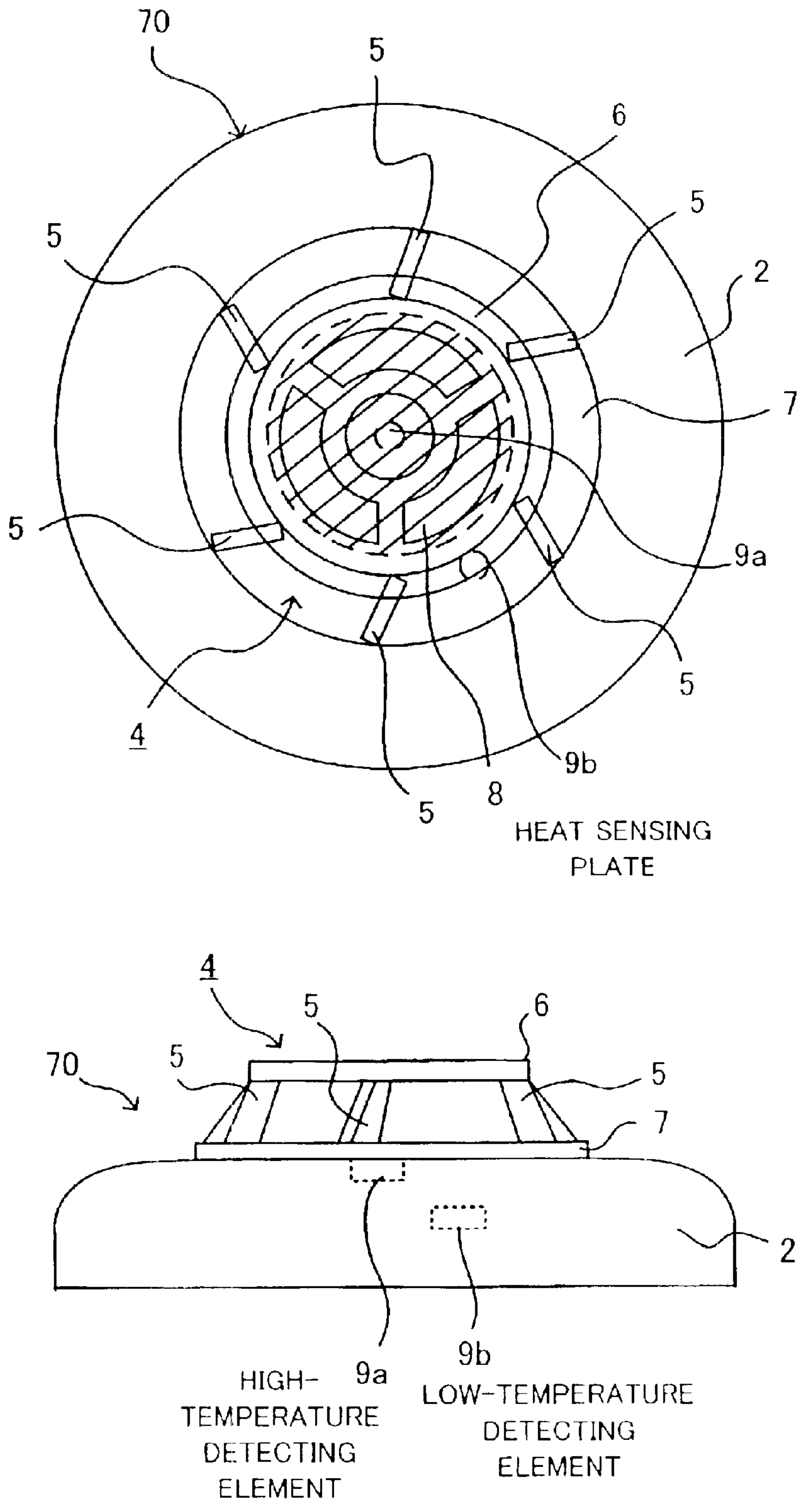
FIG. 11A is a plan view of a fire sensor constructed in accordance with a seventh embodiment of the present invention.
FIG. 11B is a side view of the fire sensor shown in FIG. 11A.

Referring to FIG. 11, there is depicted a fire sensor 70 constructed in accordance with a seventh embodiment of the present invention. The seventh embodiment is similar to the fifth embodiment of FIG. 9 performing differential heat sensing, but different in that a sensor main body 2 is provided with a heat sensing plate 8. Note that the same reference numerals denote the same parts as those of the fifth embodiment and therefore a detailed description is omitted for avoiding redundancy.

The under side of the heat sensing plate 8 is fixed to a high-temperature detecting element 9*a* such as a thermistor. A low-temperature detecting element 9*b* is disposed within the sensor main body 2 so that it is thermally separated from the heat sensing plate 8. An outer cover 4, as with the fifth embodiment of FIG. 9, is equipped with a plurality of plate fins 5 and an airflow introducing plate 6.

Figure 12:
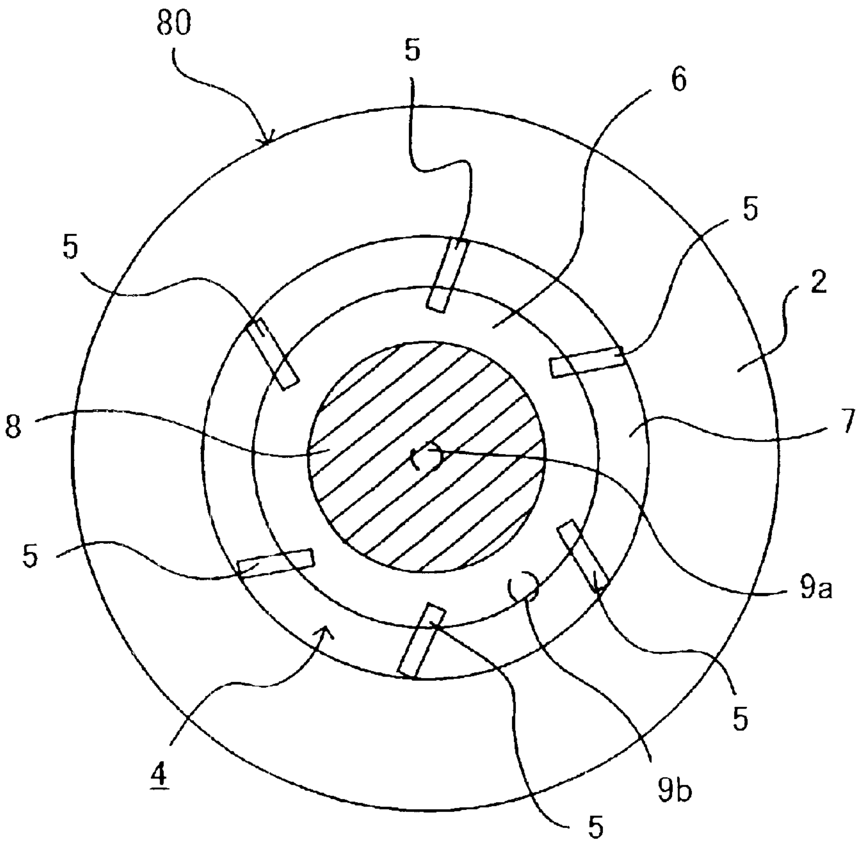
FIG. 12A is a plan view of a fire sensor constructed in accordance with an eighth embodiment of the present invention.
FIG. 12B is a side view of the fire sensor shown in FIG. 12A.
Figure 12:
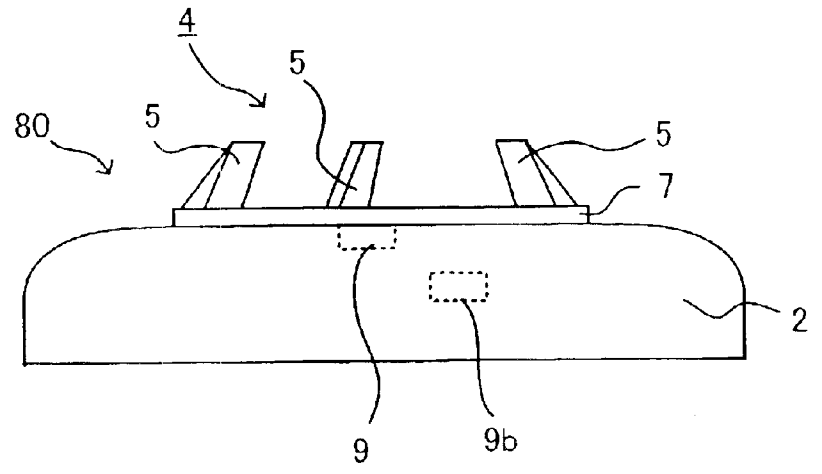

Referring to FIG. 12, there is depicted a fire sensor 80 constructed in accordance with an eighth embodiment of the present invention. The eighth embodiment is similar to the seventh embodiment of FIG. 11, but different in that it does not include the airflow introducing plate 6 of the outer cover 4 of the seventh embodiment. The remaining structure is the same as the seventh embodiment of FIG. 11.

Figure 13:
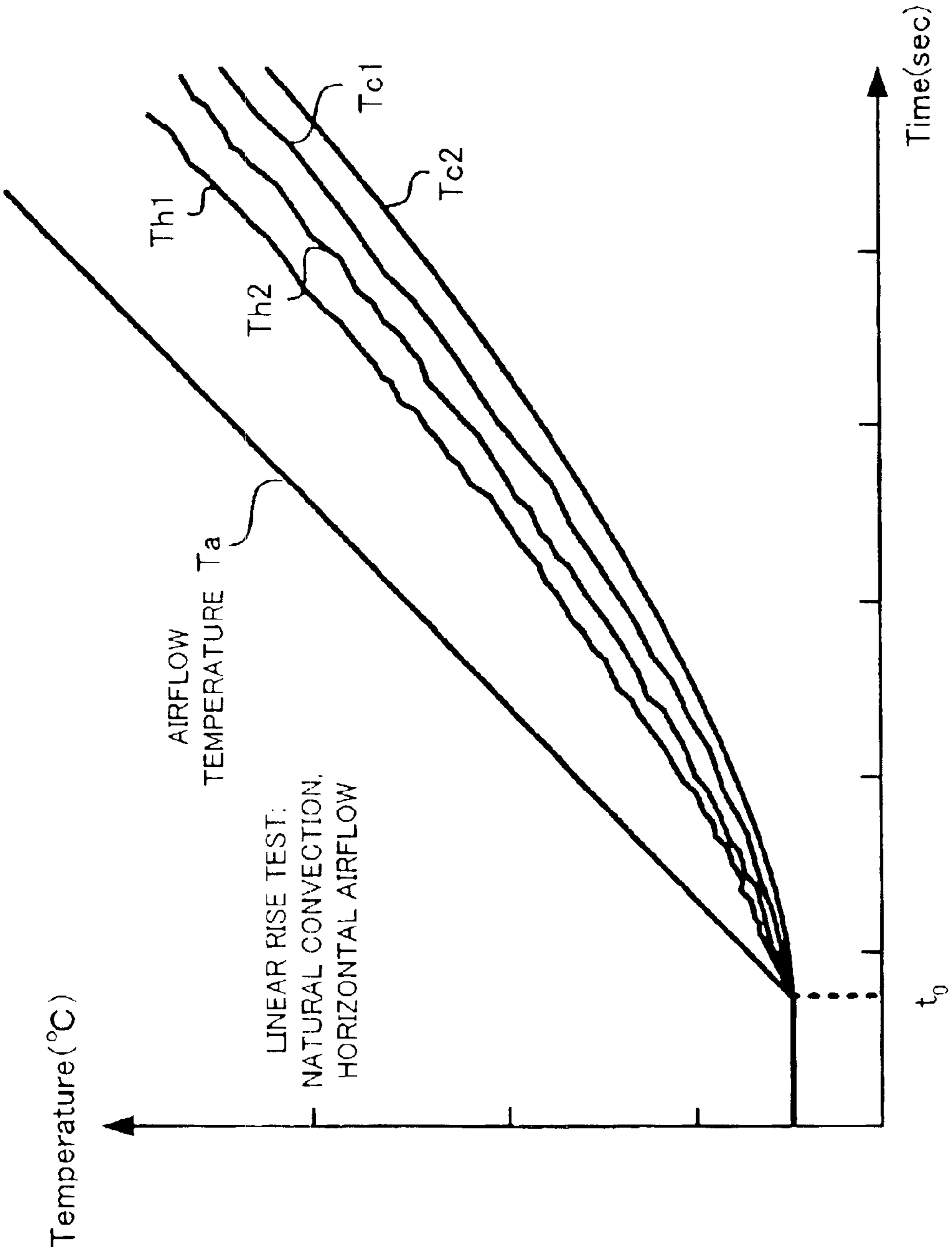
FIG. 13 is a characteristic diagram showing how the temperature of the heat detecting elements in the seventh and eighth embodiments rises.

FIG. 13 shows the temperature characteristics of the high-temperature detecting element 9*a* and low-temperature detecting element 9*b* of the seventh and eighth embodiments of FIGS. 11 and 12 in the case where airflow temperature $T_a$ is linearly increased.

In FIG. 13, airflow temperature $T_a$ is linearly increased from a certain point of time at a fixed rate. In the seventh embodiment of FIG. 11 having the airflow introducing plate 6, when airflow temperature $T_a$ is increased as shown in FIG. 13, the temperatures detected by the high-temperature detecting element 9*a* become like $T_{h1}$. The temperatures detected by the low-temperature detecting element 9*b* become like $T_{c1}$.

In the eighth embodiment of FIG. 12 having no airflow introducing plate, when airflow temperature $T_a$ is linearly increased with the same conditions, the temperatures detected by the high-temperature detecting element 9*a* become like $T_{h2}$. The temperatures detected by the low-temperature detecting element 9*b* become like $T_{c2}$.

In comparison of the detected temperatures $T_{h1}$ and $T_{c1}$ in the seventh embodiment of FIG. 11 and the detected temperatures $T_{h2}$ and $T_{c2}$ in the eighth embodiment of FIG. 12 having no airflow introducing plate, the seventh embodiment with the airflow introducing plate 6 possesses a higher ability to follow airflow temperature $T_a$. Therefore, it can be confirmed that a hot airflow can be efficiently introduced and collected at the central portion by the outer cover 4 having the airflow introducing plate 6, and sensitivity to detection can be sufficiently enhanced.

Even in the eighth embodiment of FIG. 12 having no airflow introducing plate, a high ability to follow airflow temperature $T_a$ is obtained compared with the detected temperature T2 (FIG. 6) which is obtained by the conventional structure of FIGS. 14 and 15 in which plate fins are disposed in the center direction.

In the above-described embodiments with the heat sensing plate 8, the heat sensing plate 8 is provided at approximately the center of the surface of the sensor main body 2 which is exposed to a hot airflow. And the under side of the heat sensing plate 8 is directly contacted by the heat detecting element 9 or high-temperature detecting element 9*a*. However, instead of using the heat sensing plate 8, a heat detecting element such as a thermistor in the form of a plate may be provided directly on a flat portion of the sensor main body 2 which is exposed to a hot airflow.

As set forth above in detail, the present invention has the following advantages:

(1) If the outer cover is exposed to a hot airflow generated by a fire, a vortical airflow which flows toward the center is generated and collected at the center sensing portion by a plurality of plate fins disposed at a predetermined offset angle to the center of the outer cover. Therefore, sensitivity to detecting a hot airflow can be enhanced.

(2) By mounting the airflow introducing plate on the upper ends of the plate fins so that it is approximately parallel to the sensor main body, a hot airflow introduced by the plate fins is efficiently collected at the central sensing portion. Therefore, sensitivity to detecting a hot airflow can be further enhanced.

While the present invention has been described with reference to the preferred embodiments thereof, the invention is not to be limited to the details given herein. As this invention may be embodied in several forms without departing from the spirit of the essential characteristics thereof, the present embodiments are therefore illustrative and not restrictive. Since the scope of the invention is defined by the appended claims rather than by the description preceding them, all changes that fall within the metes and bounds of the claims, or equivalence of such metes and bounds thereof are therefore intended to be embraced by the claims.

What is claimed is:

1. A fire sensor comprising:

a heat detection means for detecting heat from hot airflow generated by a fire, said heat detection means having a center;

a sensor main body provided with said heat detection means; and an outer cover which has a plurality of plate fins disposed so as to surround said heat detection means for efficiently introducing said hot airflow and protrude from said sensor main body for protecting said heat detection means;

wherein said plurality of plate fins have a predetermined offset angle to a center line crossing through the center of said outer cover and said plate fins slant away from the direction of the center of said heat detection means which are erected perpendicular to said sensor main body.

2. The fire sensor as set forth in claim 1, wherein said heat detection means comprises a single heat detecting element which protrudes from said sensor main body; and said outer cover further has an airflow introducing plate which is mounted on the upper ends of said plate fins, and said airflow introducing plate is disposed parallel to said sensor main body.

3. The fire sensor as set forth in claim 2, wherein said predetermined angle is about 20 to 30 degrees to said center line crossing through the center of said outer cover.

4. The fire sensor as set forth in claim 1, further comprises a heat sensing plate which is mounted on said sensor main body; and said heat detection means comprises a single heat detecting element which is fixed directly to said heat sensing plate.

5. The fire sensor as set forth in claim 4, wherein said outer cover further has an airflow introducing plate which is mounted on the upper ends of said plate fins, and said airflow introducing plate is disposed parallel to said sensor main body.

6. The fire sensor as set forth in claim 4, wherein said predetermined angle is about 20 to 30 degrees to said center line crossing through the center of said outer cover.

7. The fire sensor as set forth in claim 4, wherein said heat detection means comprises a high-temperature detecting element which is fixed directly to said heat sensing plate, and a low-temperature detecting element which is disposed within said sensor main body so that it is thermally separated from said heat sensing plate.

8. The fire sensor as set forth in claim 7, wherein said outer cover further has an airflow introducing plate which is mounted on the upper ends of said plate fins, and said airflow introducing plate is disposed parallel to said sensor main body.

9. The fire sensor as set forth in claim 7, wherein said predetermined angle is about 20 to 30 degrees to said center line crossing through the center of said outer cover.

* * * * *